US008483141B2

(12) United States Patent
Malkamäki et al.

(10) Patent No.: US 8,483,141 B2
(45) Date of Patent: Jul. 9, 2013

(54) EXPANDED SIGNALLING CAPABILITY FOR NETWORK ELEMENT, USER EQUIPMENT AND SYSTEM

(75) Inventors: Esa Malkamäki, Espoo (FI); Jussi Kähtävä, Mitaka (JP); Kari Rikkinen, Ii (FI)

(73) Assignee: Nokia Corporation, Espoo (FI)

( * ) Notice: Subject to any disclaimer, the term of this patent is extended or adjusted under 35 U.S.C. 154(b) by 976 days.

(21) Appl. No.: 11/444,156

(22) Filed: May 30, 2006

(65) Prior Publication Data

US 2007/0002812 A1 Jan. 4, 2007

Related U.S. Application Data

(60) Provisional application No. 60/686,852, filed on May 27, 2005, provisional application No. 60/686,832, filed on May 27, 2005.

(51) Int. Cl.
*H04W 4/00* (2009.01)
*H04W 72/00* (2009.01)

(52) U.S. Cl.
USPC ............ 370/329; 370/328; 370/338; 455/450

(58) Field of Classification Search
USPC ................. 370/320, 335, 342, 431, 432, 438, 370/439, 441, 328–330, 338; 455/450–453
See application file for complete search history.

(56) References Cited

U.S. PATENT DOCUMENTS

| 5,663,958 A | 9/1997 | Ward |
| 5,946,633 A | 8/1999 | McAlinden .................... 455/551 |
| 6,031,827 A * | 2/2000 | Rikkinen et al. ............. 370/330 |
| 6,389,284 B1 * | 5/2002 | Cook et al. .................... 455/434 |
| 6,483,822 B1 * | 11/2002 | Lioy et al. .................... 370/329 |
| 6,529,950 B1 * | 3/2003 | Lumelsky et al. ............ 709/218 |

(Continued)

FOREIGN PATENT DOCUMENTS

| EP | 0978958 | 2/2000 |
| EP | 1 274 203 A1 | 1/2003 |

(Continued)

OTHER PUBLICATIONS

Substantive Search and Examination Report dated Mar. 22, 2010 in corresponding Kenyan Patent Application No. AP/P/2007/004248 (3 pages).

(Continued)

*Primary Examiner* — Lester Kincaid
*Assistant Examiner* — Daniel Lai
(74) *Attorney, Agent, or Firm* — Harrington & Smith

(57) ABSTRACT

Several mobile station identifiers are allocated to one mobile station, one for each of a plurality of possible signalling channel structures, parameters, or both. When receiving the signalling channels, the mobile station searches for all identifiers allocated for it in the received signalling channels. When it finds one that matches, it may for instance check a mapping table (agreed at the connection setup between mobile station and the network by RRC signalling) to determine what this identifier means. The signalling channel structure, parameters, or both, used in the transmission may be implicitly or explicitly indicated by the identifier. The mobile station (User Equipment) should monitor the signalling channels in the normal way. Instead of looking for only one identifier, however, the mobile station should monitor several identifiers belonging to it.

67 Claims, 7 Drawing Sheets

U.S. PATENT DOCUMENTS

| | | | |
|---|---|---|---|
| 6,681,112 B1 | 1/2004 | Schwarz et al. | |
| 6,898,429 B1 | 5/2005 | Vialen et al. | |
| 6,970,438 B2 | 11/2005 | Mate et al. | |
| 7,171,492 B1* | 1/2007 | Borella et al. | 709/245 |
| 7,376,422 B2 | 5/2008 | Yagihashi | |
| 2002/0068569 A1* | 6/2002 | Chen et al. | 455/437 |
| 2003/0007510 A1* | 1/2003 | Yeo et al. | 370/469 |
| 2003/0012149 A1* | 1/2003 | Maggenti et al. | 370/260 |
| 2003/0045288 A1* | 3/2003 | Luschi et al. | 455/434 |
| 2003/0135626 A1* | 7/2003 | Ray et al. | 709/228 |
| 2003/0147593 A1 | 8/2003 | Slater | |
| 2003/0157953 A1 | 8/2003 | Das et al. | |
| 2003/0189918 A1 | 10/2003 | Das et al. | |
| 2003/0207696 A1 | 11/2003 | Willenegger et al. | |
| 2003/0210668 A1 | 11/2003 | Malladi et al. | |
| 2004/0057401 A1 | 3/2004 | Dick et al. | |
| 2004/0180675 A1 | 9/2004 | Choi et al. | |
| 2005/0063345 A1* | 3/2005 | Wu et al. | 370/335 |
| 2005/0073974 A1* | 4/2005 | Kim et al. | 370/329 |
| 2005/0135403 A1 | 6/2005 | Ketchum et al. | |
| 2005/0207335 A1 | 9/2005 | Schmidl et al. | |
| 2005/0220116 A1 | 10/2005 | Ahn et al. | |
| 2006/0140143 A1 | 6/2006 | Bauer | |
| 2007/0002812 A1 | 1/2007 | Malkamaki et al. | |
| 2007/0010268 A1 | 1/2007 | Kim et al. | |

FOREIGN PATENT DOCUMENTS

| | | | |
|---|---|---|---|
| EP | 1274203 | 1/2003 | |
| EP | 1517499 | 3/2005 | |
| GB | 2402846 | 12/2004 | |
| JP | 2005-123993 | 12/2005 | |
| WO | 00/54521 | 9/2000 | |
| WO | WO 00/54521 | * | 9/2000 |
| WO | 02067594 | 8/2002 | |
| WO | 2006126085 | 11/2006 | |

OTHER PUBLICATIONS

Chinese Office Action mailed May 25, 2010 in parallel Chinese Patent Application No. 200680024090-1 (8 pages) and an English translation thereof (11 pages).

Japanese Office Action mailed Aug. 3, 2010 in parallel Japanese Patent Application No. 2008-512946 (2 pages) and an English translation thereof (4 pages).

Patent Abstracts of Japan, Publication No. 2005-123993, Date of Publication: Dec. 5, 2005, 1 page.

Siemens; "EDCH identity priority"; document R2-042494 for discussion, 3GPP TSG-RAN2 Meeting #43; Shin Yokohama, Japan, Nov. 15-19, 2004, Agenda item 12.3.2 (2 pages).

3GPP TS 25.11 V6.4.0 (Mar. 2005), Technical Specification, 3$^{rd}$ Generation Partnership Project; Technical Specification Group Radio Access Network; Physical Channels and Mapping of Transport Channelsonto Physical Channels (FDD) (Release 6), (59 pages).

3GPP TS 25.212 V6.4.0 (Mar. 2005), Technical Specification, 3$^{rd}$ Generation Partnership Project; Technical Specification Group Radio Access Network; Multiplexing and Channel Coding (FDD) (Release 6), (85 pages).

* cited by examiner

UE id in HS-SCCH part #1 indicates the HS-SCCH
structure in the other two timeslots of HS-SCCH

EXPANDED SIGNALLING CAPABILITY FOR NETWORK ELEMENT, USER EQUIPMENT AND SYSTEM

CROSS-REFERENCE TO RELATED APPLICATIONS

This application claims the benefit of U.S. Provisional Patent Application Nos. 60/686,852 filed May 27, 2005 and 60/686,832 filed May 27, 2005.

BACKGROUND OF THE INVENTION

1. Technical Field

The field of the invention is mobile communications and, more particularly, to signalling used therein, for instance in the Universal Mobile Telecommunications System (UMTS) Terrestrial Radio Access (UTRA) of the Third Generation Partnership Project (3GPP) and beyond.

2. Discussion of Related Art

In further evolution of mobile communications, for example, in the WCDMA (Wideband Code Division Multiple Access) system, all services could be implemented with HSDPA (High Speed Downlink Packet Access)/HSUPA (High Speed Uplink Packet Access) (including real time (RT) services which uses a very short duration frame (transmission time interval or TTI)). Also, traditionally circuit-switched services are moving into the packet-switched domain. Although disclosed in the context of the current mobile communications environment, the present invention is not limited thereto but should be broadly seen as applicable to future evolution thereof as well.

Even though only one frequency need be used, a UMTS operator has multiple 5 MHz frequency blocks available for implementing packet-switched services in the WCDMA system. It is foreseen that different numbers of DL and UL carriers may be in use simultaneously to meet potentially asymmetric capacity needs.

Spectrum efficiency and flexible use of available spectrum will be elements of cost efficient future solutions. Efficient usage of available radio resources in the DL direction requires fast and dynamic allocation of DL carriers to different users when multiple DL carriers are available in a system. The current WCDMA deployment plans do not provide a signalling scheme/signal structure to enable fast allocation of HSDPA carriers from a pool of multiple DL carriers. WCDMA has not had multi-carrier solutions so far.

If new features are to be introduced to HSDPA (for example, the above-mentioned multicarrier, MIMO (multiple input multiple output) or additional new services such as voice over internet protocol (VoIP)), it may be that new parameters will have to be signalled (e.g., the carrier frequency in multicarrier system, stream identification or other stream specific parameters in case of multi-stream MIMO) or it may be that not all parameters or not the whole range of those parameters as presently specified may be needed (e.g., with VoIP larger transport block sizes are never used due to the low data rate). Then it could be necessary to change the frame structure of the signalling channel (HS-SCCH) in order to be able to signal the new parameters or to signal the existing parameters more reliably (e.g., if the transport block size (TBS) field were to be shortened for VoIP, more channel coding would be possible).

The HS-SCCH is used to signal parameters of the high speed data shared channel (HS-DSCH). One of the major parameters is the user equipment identifier (UE ID) which indicates which user equipment should decode the HS-DSCH. Currently only one UE ID is allocated per user equipment (according to the current specifications). The parameters and the frame structure of the HS-SCCH is fixed.

The existing structure of the HS-SCCH (High Speed Shared Control Channel) is specified for HSDPA in TS 25.211 and TS 25.212 of the 3GPP WCDMA specification, where a number of bit fields are reserved for signalling to the UE. See, for example, Section 4.6 of 3GPP TS 25.212 V 6.4.0 (2005-03). However, because of the above-mentioned evolution, in later releases of WCDMA there may arise a need to indicate different information to the UE receiving data on HS-PDSCH (High Speed Physical Downlink Shared Channel), or the UE may need to receive multiple HS-DSCH (High Speed Downlink Shared Channel) sessions simultaneously from the BS (Base Station (called Node B in 3GPP)) MAC (Medium Access Control). There is currently no room in the HS-SCCH signalling structure as defined in the 3GPP specifications to indicate the frequency carrier or some other new L1/MAC parameters that may be needed or possible.

If the problem were merely that the user equipment only needs to receive a new set of parameters, then this could be informed to the user equipment by RRC signaling. Then the UE would be able to receive parameters as it currently does but assuming a different frame structure. If, however, the UE needs to receive multiple services, then the UE may need to receive multiple HS-SCCH frame structures or formats depending on the service or some other factor. There is no mechanism to tell the UE which HS-SCCH frame structure (i.e., which parameters are signal, what is there value range and how they are channel encoded, etc.) is being used in a given transmission time interval (TTI).

Provisioning for more efficient use of DL (downlink) signalling resources could be achieved by providing some new, different HS-SCCH structures for DL HSDPA signalling. For example, for some transmissions on HS-PDSCH not all the specified fields are needed, potentially new signalling could be added, or a smaller number of bits would be enough for some of the currently existing HS-SCCH fields. Specifying another HS-SCCH structure in a later release of the 3GPP specifications is possible, but this would have to be a different HS-SCCH with redesigned coding, puncturing, error detection, etc. Just adding a new HS-SCCH to the system also brings the problem of the UE knowing which HS-SCCH structure it is to receive with. On the other hand, as suggested above, there may be multiple reasons for introducing new signalling structures in WCDMA, such as VoIP services and so on.

In view of the fact that HSDPA will be widely deployed for packet switched traffic in the near future and the need for enhancements of HSDPA, along with enhancements for the signalling, such as some new L1/MAC parameters, there would naturally be a desire to avoid changes to the high speed shared control channel (HS-SCCH). The present invention proposes how these new parameters could be signalled without changing the HS-SCCH structure or how the existing HS-SCCH signalling could be adapted to perform signalling using different signalling structure in a backwards compatible way, i.e., so as to be consistent with the existing HS-SCCH structure.

The problem has not been solved earlier. It should be noted again that this invention is not specifically confined to multi-carrier WCDMA or VoIP.

DISCLOSURE OF INVENTION

According to a first aspect of the invention, a method comprises allocating a plurality of user equipment identifiers for a single user equipment, and associating parameters, for each of said plurality of user equipment identifiers from among a plurality of different signalling parameters.

According to a second aspect of the invention, a device comprises an allocation module, responsive to a request signal, for providing a signal indicative of a plurality of user equipment identifiers for a single user equipment, and an association module, responsive to said signal indicative of said plurality of user equipment identifiers for associating signalling parameters for each of said plurality of user equipment identifiers from among a plurality of different parameters and for providing a signal indicative of the plurality of user equipment identifiers and their associated signalling parameters.

According to a third aspect of the invention, a device comprises means for allocating a plurality of user equipment identifiers for a single user equipment, and means for associating parameters for each of said plurality of user equipment identifiers from among a plurality of different signalling parameters.

According to a fourth aspect of the invention, a computer program stored on a computer readable medium is for allocating a plurality of user equipment identifiers for a single user equipment, and for associating parameters for each of said plurality of user equipment identifiers from among a plurality of different signalling parameters.

According to a fifth aspect of the invention, a system comprises a network element for allocating a plurality of user equipment identifiers for a single user equipment and for associating parameters for each of said plurality of user equipment identifiers from a plurality of different signalling parameters, and said user equipment for allocating said plurality of user equipment identifiers and for associating parameters for each of said plurality of user equipment identifiers from among said plurality of different parameters.

According to a sixth aspect of the invention, a method comprises receiving, in user equipment, radio signalling from a radio access network over a wireless interface concerning parameters needed to recover data in a data channel arriving after said signalling wherein said signalling is distinguishable by a user equipment identifier for said user equipment having assigned thereto multiple user equipment identifiers, and carrying out a downlink carrier assignment in said user equipment according to said signalling for receiving said data channel in said user equipment.

According to a seventh aspect of the invention, apparatus comprises user equipment receiver, responsive to radio signalling from a radio access network over a wireless interface wherein said signalling is indicative of parameters needed to recover data in a data channel arriving after said signalling wherein said signalling is distinguishable by a user equipment identifier for said user equipment having assigned thereto multiple user equipment identifiers, and a signal processor for carrying out a downlink carrier assignment in said user equipment according to said signalling for receiving said data channel in said user equipment.

According to an eighth aspect of the present invention, apparatus comprises means for receiving in user equipment radio signalling from a radio access network over a wireless interface concerning parameters needed to recover data in a data channel arriving after said signalling wherein said signalling is distinguishable by a user equipment identifier for said user equipment having assigned thereto multiple user equipment identifiers, and means for carrying out a downlink carrier assignment in said user equipment according to said signalling for receiving said data channel in said user equipment.

According to a ninth aspect of the invention, a method for execution in user equipment in a multi-carrier system, comprises said user equipment receiving a radio signal on a downlink, and carrying out a fast downlink carrier assignment in said user equipment in said multi-carrier system in response to physical layer signaling in said radio signal received on said downlink.

According to a tenth aspect of the invention, user equipment for use in a multi-carrier system, comprises a receiver, responsive to a radio signal on a downlink, and a signal processor for carrying out a fast downlink carrier assignment in said user equipment in said multi-carrier system according to physical layer signaling in said radio signal on said downlink.

According to an eleventh aspect of the invention, user equipment for use in a multi-carrier system, comprises means for receiving a radio signal on a downlink in user equipment, and means for carrying out a fast downlink carrier assignment in said user equipment in said multi-carrier system by physical layer signaling in said radio signal on said downlink.

BEST MODE FOR CARRYING OUT THE INVENTION

Figure 1A:
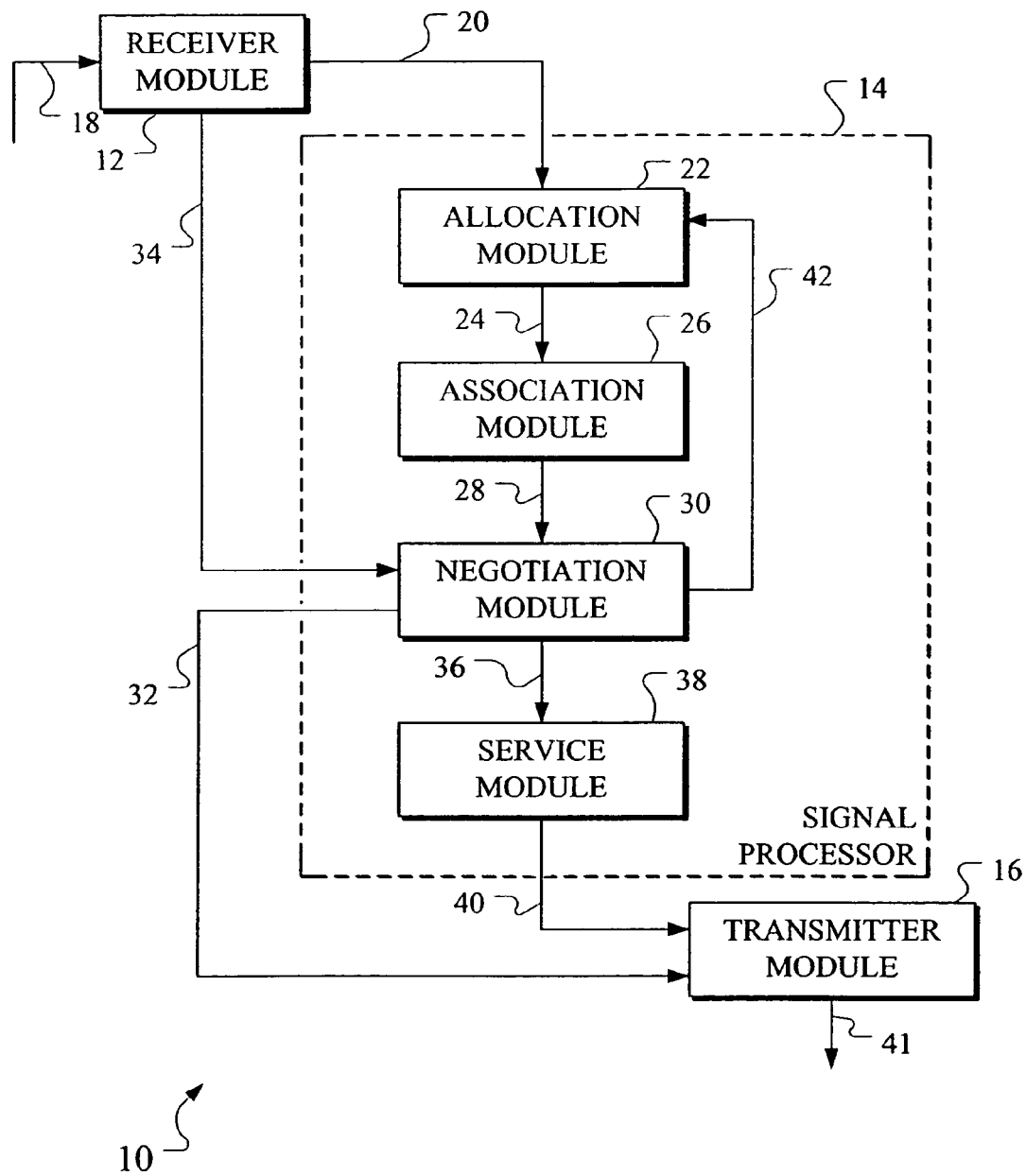
FIG. 1A shows a device for carrying out the present invention with a server of modules in combination.

In the 3GPP WCDMA system the base station (Node B) is a network element that sends signalling (control) information on four different high speed shared control channels (HS-SCCHs) although more than four are possible. The HS-SCCHs are sent in parallel during the same recurring time interval, e.g., during a two millisecond transmission time interval (TTI). The HS-SCCHs are sent over the whole cell or parts thereof for monitoring by various user equipment (UEs) which may be present in the cell. During this time that UEs are sending back periodic (for instance every ten milliseconds) channel quality indicator (CQI) signals to the Node B. The control information for a given UE, according to the prior art, is contained in one and only one of the four parallel HS- SCCHs. If a UE is able to check all four HS-SCCHs, it tries to find the HS-SCCH intended for it by checking its UE identifier in one of the four possible channels. When it detects the UE ID unique to itself in the first part of the HS-SCCH, it then reads the rest of the information in the second part of the HS-SCCH in question in order to be able to properly process information contained in digital samples extracted from the HS-PDSCH (High Speed Physical Downlink Shared Channel) which arrives a short time later. The parameters needed to demodulate and decode (channelization code-wise) the physical channel are contained in the first part of each TTI, i.e., in the first third of the two millisecond transmission time interval used for the HS-SCCH. The two millisecond TTI is broken down into three equal duration slots, the first part being one slot in duration (two thirds of a millisecond) and the second part being two slots in duration (four thirds of a millisecond) and containing information needed to further process the demodulated and decoded information. The HS-PDSCH frame begins after the first part of the HS-SCCH.

According to the present invention, more than one UE identifier can be allocated or assigned for one UE and each identifier indicates which signaling structure is being used in a given transmission time interval, or it indicates some new parameter value, or both.

If, according to one embodiment, more than one UE ID is allocated or assigned for one UE and the UE ID indicates which HS-SCCH frame structure is being used in the current TTI, it is in this way possible to dynamically change between different structures. For instance, if we have a need for different HS-SCCH structures such as a first structure optimized for VoIP and another structure for normal traffic such as what has already been specified for other services, then two UE IDs could be allocated or assigned according to the invention for the single UE, one for VoIP and the other for everything else. When the Node B sends a VoIP packet to the UE, it would use the UE ID allocated for VoIP usage and the UE would know based on the UE ID that now (in the current TTI) the HS-SCCH structure is the new VoIP optimized structure. And for other data, the other UE ID and HS-SCCH frame structure would be used.

Or, according to another embodiment, we could have a multicarrier system where only high data rates are allocated on some carriers (DO-DSCH) and low data rates on the carrier on the core band. You could then have a different HS-SCCH frame structure to support the high data rate carriers (that HS-SCCH would also indicate the carrier/band) and the normal structure to support the core band traffic. The UE would be allocated to two UE IDs, one for normal operation and the other for multicarrier operation. The UE ID would then indicate on the HS-SCCH which frame structure is used.

Or, according to a third embodiment, a MIMO system could be provided, where high data rates are allocated to a multi-stream MIMO operational mode and low data rates to a normal single-stream SIMO (single input multiple output) operational mode. The user equipment would be allocated to two or more UE IDs, one for the normal SIMO operational mode and the others for the multi-stream MIMO operational mode.

The HS-SCCH structure is currently specified in 3GPP TS 25.212, V.6.4.0 (2005-03) and it currently carries the following parameters (see section 4.6 of TS 24.212): the modulation scheme (1 bit) and the channelization code set (7 bits) assigned for the user, as well as the transport block size (6 bits), the HARQ process ID (3 bits), redundancy and constellation version (3 bits), new data indicator (NDI) (1 bit) and UE specific CRC (16 bits). The UE specific CRC is calculated as a normal 16 bit CRC which is XORed with the 16 bit UE ID (H-RNTI (HS-DSCH radio network temporary identifier)). In addition to its use in conjunction with the UE specific CRC, the UE ID is also used for UE specific masking of the first slot of the HS-SCCH (as suggested above, the first slot of the HS-SCCH TTI includes the modulation scheme and channelization code set parameters). For details of UE specific masking and UE specific CRC, see, especially the FIG. 19 coding chain of the 3GPP specification TS25.212. Based on the UE specific masking of the first slot of the HS-SCCH transmission, the UE is quickly able to identify whether the transmission is for it or not. If the masking matches, the UE starts demodulating the indicated HS-PDSCH code channels and at the same time reads the rest of the HS-SCCH (Part 2 with the further processing info). The UE specific CRC at the end of the HS-SCCH confirms that the transmission was intended for this UE as well as that the parameters are correctly received (without errors).

Further according to the present invention, the multiple UE IDs associated with a given UE can indicate different HS-SCCH structures, i.e., different from that just described above in the previous paragraph.

Figure 2:
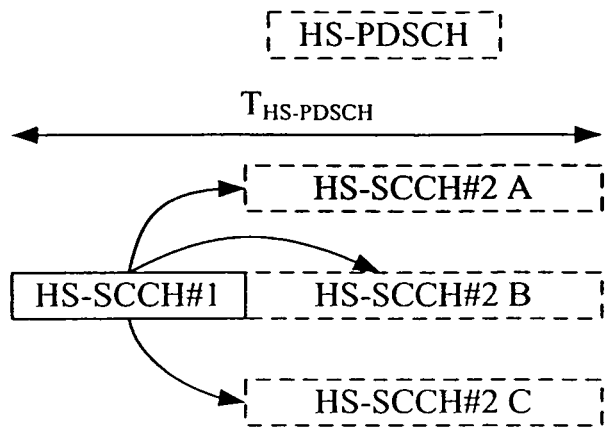
FIG. 2 presents the concept of how the UE ID located in HS-SCCH part #1 may be used to indicate the HS-SCCH structure.

Thus, according further to this invention, as shown for example in FIG. 2 hereof, it is proposed not only to allocate multiple UE IDs for one UE, e.g., one for each possible HS-SCCH structure that the UE is able to receive, but also to make it so a UE ID can be allocated so as to be associated with any one of multiple possible signalling structures. The mapping between the UE ID and the respective HS-SCCH structure can for instance be agreed to between UE and network via RRC signalling at the connection setup phase. The UE ID would be used on HS-SCCH in the same way as it is used today: both for UE specific masking of the first slot as well as for the UE specific CRC except that a given UE may have the possibility of having more than one UE ID assigned to it.

Referring now to FIG. 1A, a device 10 is shown comprising a receiver module 12, a signal processor 14, and a transmitter module 16. The device 10 may for instance be a network element such as base station or Node B or may be user equipment or a mobile station. In such cases, to which the invention is not limited, the receiver module and transmitter module will communicate over a radio interface via one or more antennas with another device. If the device 10 is a base station or Node B network element, it will communicate over the radio interface with a mobile station, known as "user equipment" in 3GPP specifications. If the device 10 is user equipment then it will communicate over the radio interface with the network element in the form of a Node B or base station. In either event, the concept is the same and will be described generally so that the device 10 shown in FIG. 1A can be understood as being in whole or in part at either the core network side, for instance at an access point, or at the user equipment side of the radio interface. It should also be understood that although a series of modules are shown connected in series in a certain order, the ordering is flexible in that it can be rearranged so that the functions identified for each module can be performed before or after the sequence shown for any given module or any combination of modules. It should also be understood that modules may be added or detracted without departing from the invention. In other words, it should also be understood that more or less modules than shown can be used in combination with those shown to carry out the invention. In other words, in certain embodiments, certain modules may be omitted or certain others may be added. Moreover, the illustrated functions can be carried out in different entities and need not be carried out in the same "device." Therefore, the word "device" should be understood in that sense. It might for instance be possible even for part of a given function to be carried out in one device while another part of the same function is carried out in another device. When partitioning a function in this way, it is even possible to perform part of the function on one side of the wireless interface and another part on the other side. The description of the signal processing carried out in the device 10 of FIG. 1A should therefore be understood as being a flexible signal processing device or method with the capability of performing the illustrated functions in any order or location according to the circumstances needed or according to the designer's choice. The device 10 of FIG. 1A will first be described as a network element or part thereof, e.g., a base station or Node B of the 3GPP network. The device of FIG. 1A will then be described, in connection with the system of FIG. 1B, as fulfilling the role of user equipment or part thereof in the same 3GPP network.

Assuming for the moment the device 10 of FIG. 1A is a network element such as a Node B, the receiver module 12 may receive a request signal on a line 18 from the user equipment over the radio interface requesting multiple services from the network. The receiver module processes this request signal and provides a process request signal on a line 20 to the signal processor 14 in the network element. This function as well as others to be described could be performed anywhere in the core network. According to an embodiment of the invention, an identification module 22 is responsive to the processed request signal on the line 20 for identifying a plurality of user equipment identifiers for the single user equipment that has made the request for multiple services. For instance, the identification module 22 could assign a separate user equipment identifier for each service requested by the single user equipment. The result of the identification process carried out by the identification module 22 is signalled by a signal on a line 24 to an association module 26 which, according to the present invention, associates a signalling structure, or parameters, or both, for each of the plurality of user equipment identifiers identified by the signal on the line 24. These signalling structures, or parameters, or both, are selected by the association module from among a plurality of different signalling structures, or parameters, or both, available to it. The association module may assign structures, or parameters, or both that are appropriate for the services requested by the user equipment. The association module 26 then provides a signal on a line 28 indicative of the plurality of user equipment identifiers and their associated signalling structures, or parameters, or both, as selected by the association module and identified by the identification module. Although shown as two distinct modules 22, 26, it should be realized that one or both of these modules may be viewed as a single module for allocating or assigning a user equipment identifier which indicates the HS-SCCH structure, or parameters, or both, or which indicates the presence of certain parameters in the existing HS-SCCH structure.

A negotiation module 30 may be provided, responsive to the signal on the line 28 from the association module 26 for providing a signal on a line 32 for transmission over the radio interface back to the user equipment for the purpose of negotiating the plurality of user equipment identifiers and their associated signalling structures, or parameters, or both, with the user equipment before taking them up into use. The transmitter module 16 is responsive to the signal on the line 32 for transmitting the plurality of user equipment identifiers and their associated signalling structures, or parameters, or both, to the user equipment as proposed identifiers and signalling structures, or parameters, or both, for consideration by the user equipment. If the user equipment agrees, it may signal its acceptance back to the device 10 over the radio interface with a signal on the line 18 received by the receiver module 12 where it is processed and forwarded as a signal on a line 34 back to the negotiation module 30. If the user equipment has agreed with the proposed plurality of user equipment identifiers and associated signalling structures, or parameters, or both, the negotiation module 30 will be able to determine that fact from the signal on the line 34 and it in turn will then be in a position to provide a negotiated signal on a line 36 to a service module 38 which will carry out a process of delivering the requested services over the radio interface from the network to the user equipment via the transmitter module 16 using the plurality of negotiated user equipment identifiers and associated structures, or parameters, or both, using the signalling structure indicated by the previously negotiated signalling structures, parameters, or both, for the corresponding different services requested by the user equipment. This is shown by a signal on a line 40 provided from the service module 38 to the transmitter module 16. The transmitter is shown providing the services over the radio interface by a signal on a line 41. If the signalling back from the user equipment during the negotiation process indicates on the line 34 that the user equipment cannot for some reason accept the proposed plurality of user equipment identifiers and associated signalling structures, or parameters, or both, the negotiation module will provide a signal on a line 42 back to the identification module 22 signalling that fact and requesting a repeat process which either varies the proposal or proposes it again. In this way, a back-and-forth negotiation can take place between the network element and the user equipment to decide upon the plurality of user equipment identifiers and the appropriate associated signalling structures, or parameters, or both, that can be agreed upon on both sides. Although shown as three distinct modules 22, 26, 30, it should be realized that one or more of these modules may be viewed as a single module for allocating or assigning a user equipment identifier which indicates the HS-SCCH structure or the presence of certain parameters in the existing HS-SCCH structure. It will be appreciated that the service module may include two distinct modules, one for providing the signaling (e.g., on a HS-SCCH) with associated UE identifiers, according to the invention, and another for providing the services themselves (e.g. on a HS-PDSCH).

It will also be appreciated that in the illustrated embodiment the services provided by the service module and provided on the line 40 to the transmitter module are actually delivered on the radio interface on the signal line 41 by the transmitter module in conjunction with an antenna using a transport channel which is different from the signalling channel (e.g., HS-SCCH) used for the identification (assignment of UE identifier) and association (association of a structure, parameters, or both, with a UE ID) processes and then the negotiation as just described. In the context of the previously described environment of HSDPA, the HS-PDSCH is sent after the HS-SCCH (signalling) frame has already begun so that it will arrive at the midpoint of the second part of the HS-SCCH TTI which is sent slightly in advance because it contains the information needed by the receiver to demodulate and decode (channelization code-wise) the data carried by the transport channel. In other words, for example, the HS-PDSCH should start arriving at the beginning of the third (last) slot of the HS-SCCH. It bears mentioning that the HS-PDSCH frame in this embodiment has a duration the same as the HS-SCCH TTI, i.e., two milliseconds. Thus, although they overlap partially, the HS-SCCH TTI begins four thirds of a millisecond before the beginning of the HS-PDSCH TTI.

Figure 1B:
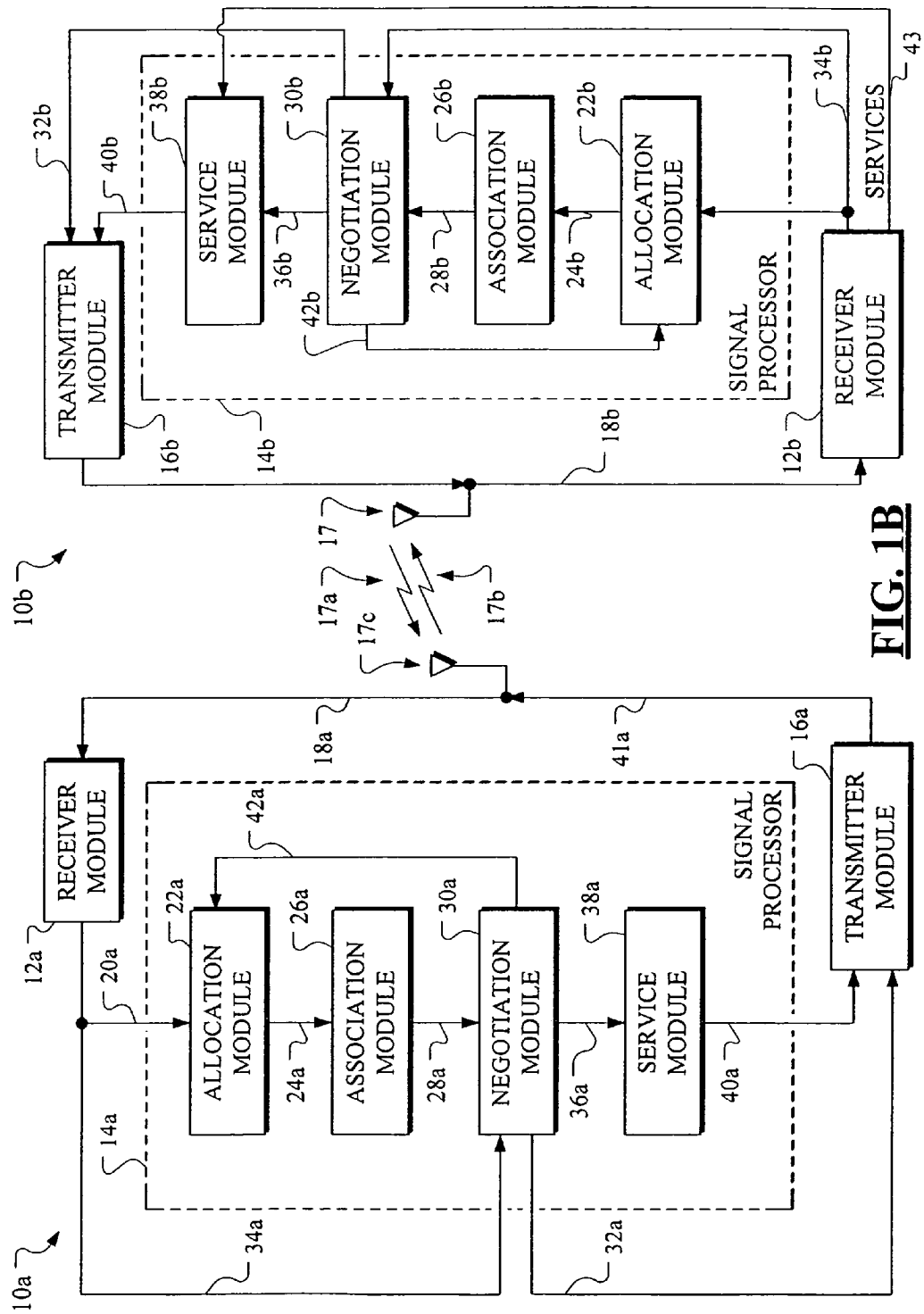
FIG. 1B shows two devices, each similar to the device of FIG. 1A, operating together as a system comprising a base station and user equipment.

Although the device 10 of FIG. 1A has so far been described as taking on the role of a network element, it has already been mentioned that it could also take on the role of a user equipment and such a role will now be described in some detail. FIG. 1B shows the above-described network element embodiment on the left hand side labeled as device 10a. The above described reference numerals used in FIG. 1A have been repeated on the left hand side of FIG. 1B except using the suffix "a". On the right is shown a user equipment embodiment labeled on device 10b. In the system embodiment of FIG. 1B, the user equipment 10b may send the above-mentioned request for multiple services to the network element 10a for instance by means of a negotiation module 30b although it could be carried out by some other (not shown) module. In the event that the negotiation module 30b sends the request, the signal on the line 32b will carry the request to the transmitter module 16b and transmit the request on an uplink 17a via an antenna 17 to the network element 10a in the form of a Node B or base station. Receipt of such a request has already been described in connection with the network element 10a embodiment in the description appearing immediately above in connection with FIG. 1A. Such a request, as already described, would be processed in the network element 10a with a resultant negotiation process involving the user equipment 10b. If the network element 10a proposes a plurality of user equipment identifiers with associated signalling structures, or parameters, or both, and signals same on a line 41a on a downlink 17b via an antenna 17c to the user equipment, it will be received in the receiver module 12b of the user equipment 10b embodiment and provided on a line 34b to the negotiation module 30b. In the user equipment embodiment 10b, the negotiation module 30b may consider the proposed identifiers and associated signalling structures, or parameters, or both, sent by the network element and agree to same. In that case, the negotiation module 30b sends a signal on the line 32b to the transmitter module 16b where, in response thereto, an acceptance signal is sent back to the network element 10a over the radio interface. If the negotiation module 30b cannot accept the proposal, the UE 10b could simply signal back a non-acceptance and let the network make a new proposal as described previously. Or, it can for instance provide a signal on the line 42b to the identification module 22b of the user equipment 10b and the user equipment can then propose its own plurality of user equipment identifiers and provide an indication thereof on the signal line 24b to the association module 26b where signalling structures, or parameters, or both, appropriate for each identifier are associated therewith and signalled on the line 28b back to the negotiation module 30b which can then propose same on the line 32b back to the network element via the transmitter module 16b.

On the other hand, the user equipment in the device 10b embodiment shown in FIG. 1B could instead itself initiate the methodology of the present invention without first having received a proposal from the network element 10a. In other words, the user equipment 10b may signal to the identification module 22b by means of some (not shown) application layer module that a service or that a number of services are desired and the identification module will then identify one or a corresponding plurality of user equipment identifiers for use by the user equipment 10b and send an indication thereof on the signal line 24b to the association module 26b where an association is made between corresponding signalling structures, or parameters, or both, and the plurality of user equipment identifiers, considering the services requested. Once the plurality of user equipment identifiers and associated signalling structures, or parameters, or both, are ready to be proposed, an indication thereof is sent on the signal line 28b to the negotiation module 30b which can then provide a signal on the line 32b to the transmitter module 16b for transmission on a radio uplink to the network element 10a for consideration by the network. If the network agrees, an acceptance signal can be sent on a radio downlink 17b which is received by the user equipment 10b antenna 17 and then provided on the line 18b to the receiver module 12b where it is processed and provided on the line 34b back to the negotiation module 30b of the user equipment 10b. Once the plurality of user equipment identifiers and associated signalling structures, or parameters, or both, are agreed upon by both the user equipment and the network element, the negotiation module 30b can signal the successfully negotiated plurality of user equipment identifiers and associated signalling structures, or parameters, or both, on the signal line 36b to the service module 38b which processes that information before participating with the network element in the delivery and consumption of network services which may involve both the transmission of information on the line 40b on an uplink via the antenna 17 to the network element as well as reception of services on a line 18b from the device 10a transmitted on a downlink 17b from the network element 10a to the user equipment 10b. Before the service module sends a service in the form of a data payload packet on the HS-PDSCH, it will send the corresponding signaling on the HS-SCCH using the UE identifier previously assigned corresponding to the service. The receiver 12b receives the HS-SCCH signaling and provides it to the identification module 22b where it is checked and recognized as belonging (having been previously assigned) to the particular single UE 10b. It then signals the particular UE ID to the association module 26b where the corresponding structure, or parameters, or both, are determined. This information can then be provided directly to the service module for use in interpreting the subsequently incoming service packet with the payload data. The receiver module 12b can then receive the service packet delivered on the downlink on the line 18b and provide the downloaded service packet on a line 43 directly to the service module 38b for interpretation and consumption i.e., at higher layers within the UE 10b.

It bears mentioning that although the network element and user equipment embodiments discussed above in connection with FIGS. 1A and 1B are shown as hardware comprising various modules in combination, these modules may also be viewed as comprising means for carrying out the functions identified so that the identification module corresponds to means for identifying a plurality of user equipment identifiers for a single user equipment, the association module corresponds to means for associating a signalling structure, or parameters, or both, for each of the plurality of user equipment identifiers from among a plurality of different signalling structures, or parameters, or both, the negotiation module can be viewed as negotiation means for negotiating the identifiers and the service module can be viewed as means for providing, consuming or participating in a service communicated over a radio interface. Such services may include real time services such a voice over IP, data services which are not as delay sensitive as the real time services, or the like. It should also be understood that such means should also be understood as embracing the functions described below in connection with the flowcharts of FIGS. 5 and 6 as carried out by coded instructions executed by the signal processor of FIG. 7 or by an equivalent hardware structure such as an ASIC or DSP.

Although not limited thereto, an embodiment of this invention for use in an HSDPA environment requires that the first part of the HS-SCCH is unchanged from the current state of the art, i.e., the number of control bits (=8) is the same as well as the channel coding, puncturing and UE specific masking. The content of these eight control bits may be UE ID dependent. The second part can be changed, i.e., even the number of control bits and thus the channel coding, puncturing, etc. can be different and is therefore future-proof as shown for example in FIG. 2. As described earlier, the Part 1 of HS-SCCH contains eight bits, 1 bit for modulation scheme and 7 bits for channelization code set. These are convolutional encoded and masked with a sequence derived from the UE id. For the VoIP or some other low bit rate service, the amount of bits to be transmitted can be so low that typically only QPSK modulation is used and only a few channelization codes (i.e., HS-PDSCHs) are needed, say only one or two. Then if only QPSK is used for this service or user, no modulation scheme needs to be indicated on HS-SCCH. Similarly, if only a maximum of two channelization codes were needed, the channelization code set could be indicated with 5 bits (4 bits to indicate the starting point of the codes and 1 bit to indicate the number of codes, i.e., 1 or 2). Then three remaining bits of HS-SCCH part 1 could be used for other purposes (e.g. signaling other parameters). If the amount of possible channelization codes were smaller, e.g., only 8, then only 3 bits would be needed to indicate the starting point of the codes. In this case totally only 4 bits would be needed and then their performance could be improved by simply repeating the bits twice before convolutional encoding. Instead of repetition code, other more powerful block codes could be used to improve the performance of the signaling bits of the part 1 without changing the masking and convolutional coding structure. The UE would know which parameters are signaled with the 8 bits of the Part 1 based on the UE id (that is used for masking of Part 1). Furthermore, after receiving the Part 1 and based on the detected UE id (that was used for masking the Part 1), UE knows how to interpret the Part 2 of HS-SCCH. Now it is possible to change the Part 2 completely: the number of signaling bits can be different as well as the meaning of those bits. Even the channel coding can be different from the one used in the current specifications. For instance, in the VoIP case the transport block size (TBS) is more limited and less than 6 bits could be allocated for it. Furthermore, the number of redundancy versions could be less, etc. With less signaling bit stronger channel coding can be applied and thus less transmit power is needed. Alternatively, more or other signaling parameters can be sent.

Thus, as explained in more detail above, one example case where this invention could be very much needed is VoIP transmission on HS-DSCH. VoIP packets are typically rather small, implying that not all control bits specified currently for HS-SCCH may be needed. One could specify a more optimized HS-SCCH structure for VoIP (e.g., with stronger channel coding for the second part). Then a UE receiving both VoIP traffic and other data traffic would be configured with two UE IDs, one for VoIP and the other for the other data traffic. When a VoIP packet is transmitted to the UE, then the VoIP specific UE ID and corresponding HS-SCCH structure is used and when other data is transmitted to the UE, then the normal HS-SCCH structure with the other UE ID would be used.

FIG. 2 tries to show that depending on the UE ID based mask used for HS-SCCH Part 1 indicates which structure (A, B or C) is used for HS-SCCH Part 2. For instance, A could be the currently specified structure (including the specified parameters and their value ranges and interpretation as well as the channel coding), B could be a new structure specified, e.g., for VoIP (as explained above), C could be a new structure specified, e.g., for multicarrier transmission. Then three different UE IDs would be allocated for a single UE if that UE is supposed to receive normal (current spec) HS-SCCH transmission, VoIP transmissions and multicarrier transmissions. If some UE only receives normal transmissions, then only one UE ID would be allocated for it.

Another embodiment of the present invention involves using the same frame structure as already defined in the specifications for the HS-SCCH (same parameters with the same value ranges and same channel coding) but to use the UE ID to indicate some new parameter value, e.g., frequency carrier for multicarrier system or stream ID for multistream MIMO or additional HARQ process IDs. The frequency carrier or stream ID examples are new parameters while the additional HARQ process IDs example is an extension of the value range of an existing parameter. For instance, if we have a multicarrier system with four carriers, then each multicarrier UE would be allocated for UE IDs. Then, depending on which carrier/band is used to send data for this UE, the corresponding UE ID is being used. This can for instance be done explicitly or implicitly.

Thus, this embodiment of the invention uses the same frame structure for the HS-SCCH as presently specified with the same parameters and with the same value ranges and the same channel coding. However, the different UE IDs are used to indicate some new parameter values.

Figure 3A:
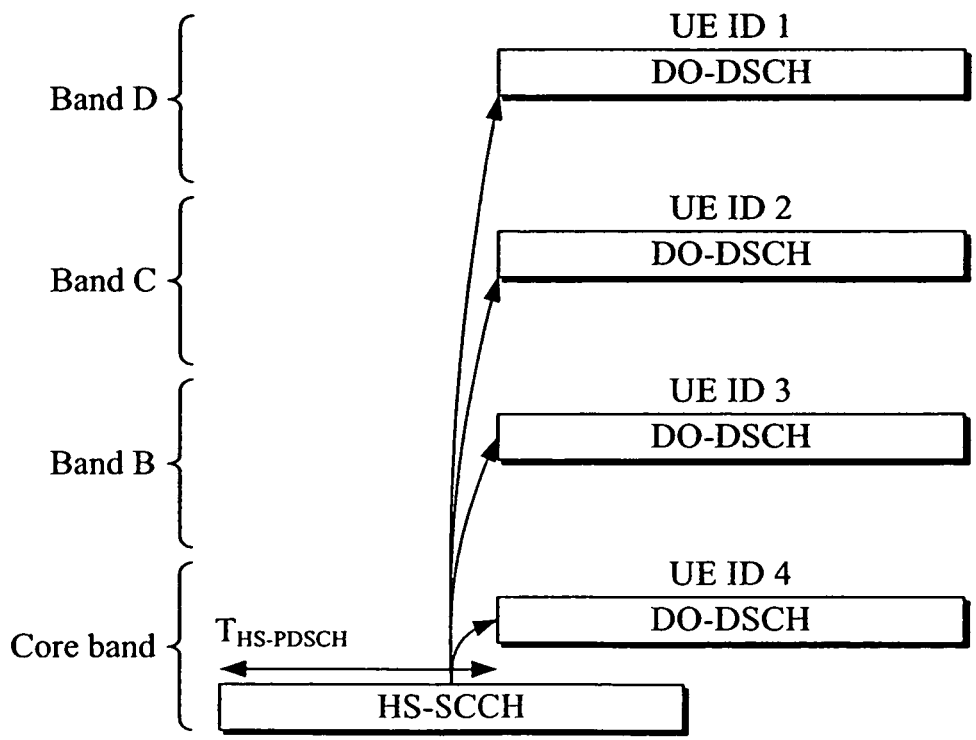
FIG. 3A presents an implementation A for fast carrier assignment, where the DL carrier band (A(Core), B, C, or D) is explicitly indicated as embedded information that HS-SCCH carries; it presents the UE ID indicating the frequency carrier/band.

A) Explicit Method (See FIG. 3A):

FIG. 3A presents an implementation A for fast carrier assignment, where the DL carrier band (A(Core), B, C, or D) is explicitly indicated as embedded information that HS-SCCH carries; it presents the UE ID indicating the frequency carrier/band.

In FIG. 3A, UE ID number 1 is used for explicitly indicating band D, UE ID number 2 for explicitly indicating band C, etc. In this way, there is no need to change the HS-SCCH frame structure to be able to send some new parameter or to extend the value range of some parameter while at the same time having the ability to allocate more than one UE ID for one UE so that it is possible to dynamically change between different parameters used for different transmission time intervals (TTIs).

Thus, the DL HS-SCCH carries information embedded in it explicitly indicating the frequency band (for instance A (Core), B, C, or D) where the UE will receive the high speed physical downlink shared channel (HS-PDSCH). After the UE deciphers the embedded information it can start receiving signal on a DL carrier different from the core carrier. In such a case, a UE ID could indicate that HS-SCCH uses 'multicarrier' structure. This could for instance mean that the Part 1 carries frequency carrier info instead of modulation and channelization code info. This would enable the possibility that the UE could start buffering the data at the indicated frequency band (carrier). The 'multicarrier' structure could further mean that Part 2 is transmitted together with the data on the new carrier. If there are a maximum of four frequency carriers, then two bits are needed to indicate the carrier frequency. Then only six bits were left for modulation scheme and channelization code set. This could be enough if the other data carriers (DO-DSCH=data only downlink shared channel) were assumed to be allocated for high bit rates only (no need to indicate, e.g., single codes). The other possibility is that part of that information is sent in Part 2 together with other parameters. It is also possible that all the HS-SCCH information is sent core band, as shown in FIG. 3. Then the UE has to be able to receive simultaneously on multiple bands: HS-SCCH on core band and the data channel (DO-DSCH) on the other band and the band to be used for the data transmission is determined by the UE id used on HS-SCCH.

Figure 3B:
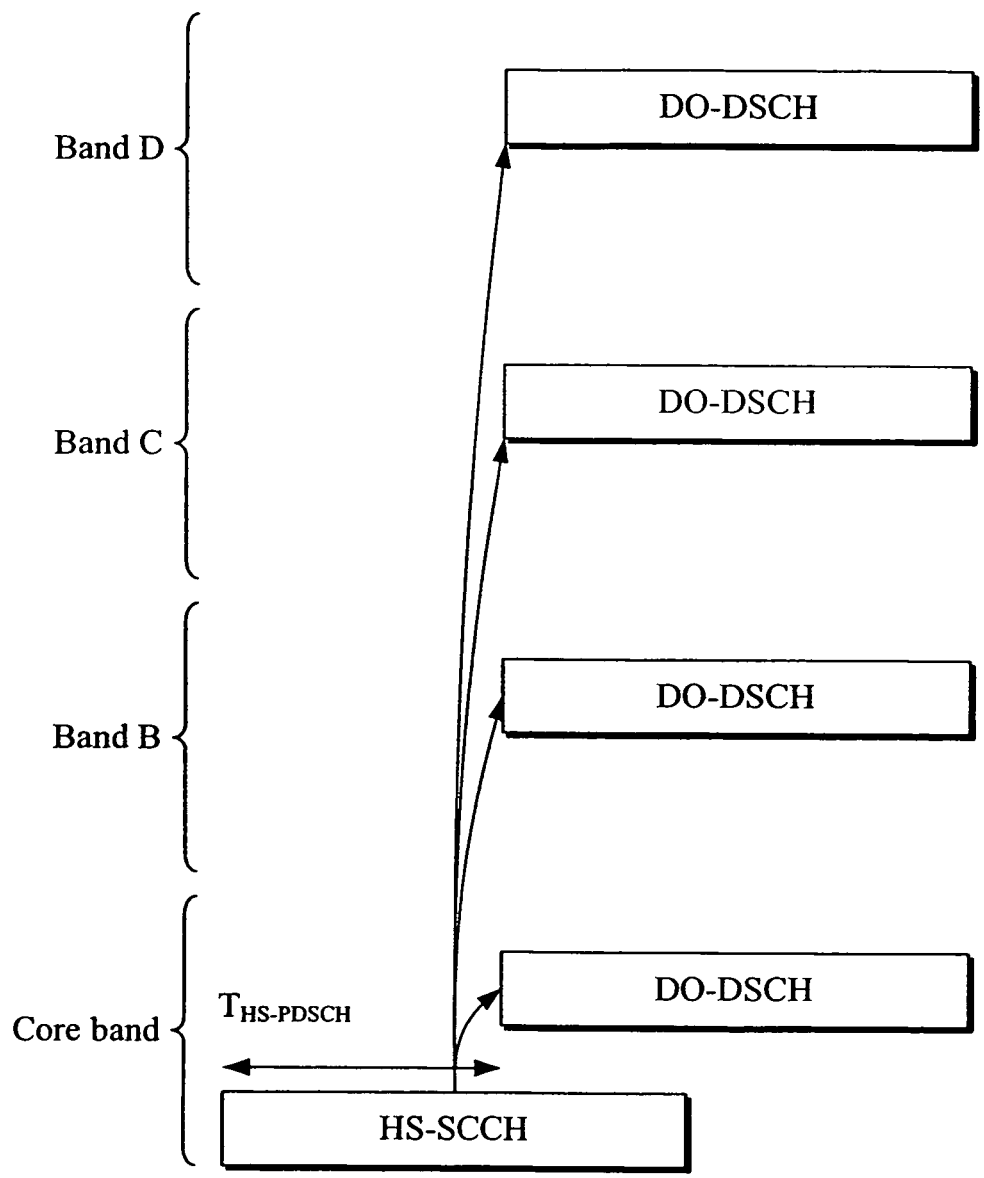
FIG. 3B shows another explicit signalling method with an explicit DL carrier number parameter added to HS-SCCH.

Another explicit signaling method is depicted in the embodiment of FIG. 3B. Here an explicit DL carrier parameter is added to HS-SCCH, preferably in the Part 1 which is sent before the data channel (DO-DSCH). This implies that the HS-SCCH frame structure or the parameter fields need to be changed. The changed HS-SCCH structure can be told to the UE, e.g., by RRC signaling. Thus unlike the other embodiments only one UE ID is needed in this case. UE would normally detect and decode HS-SCCH channels and when it finds HS-SCCH with a matching UE ID mask, it reads the parameters from HS-SCCH. Now, the new parameter for DL carrier sent on HS-SCCH would tell the band to be used for data transmission/reception.

Figure 4:
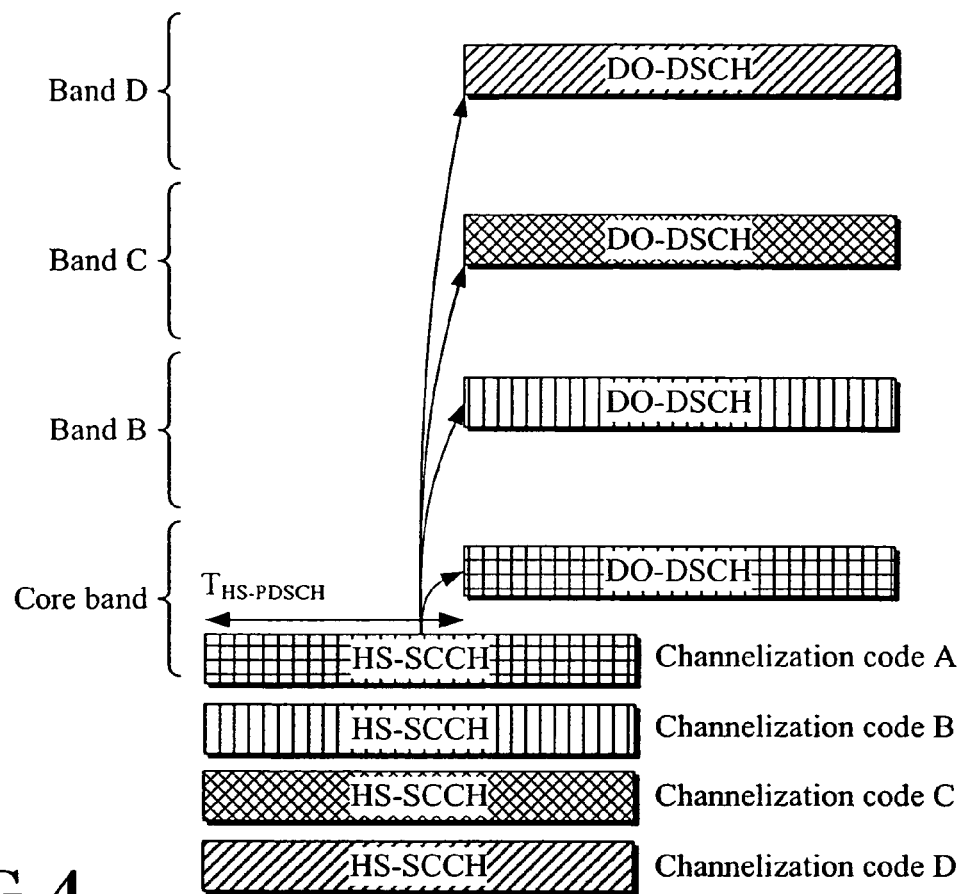
FIG. 4 presents an implementation B for fast carrier assignment, where the DL carrier is implicitly mapped from the channelization code used on the HS-SCCH assigned for the UE.

B) Implicit Method (See FIG. 4):

FIG. 4 presents an implementation B for fast carrier assignment, where the DL carrier is implicitly mapped from the channelization code used on the HS-SCCH assigned for the UE.

DL HS-SCCH channelization code is implicitly matched into a DL carrier number (this mapping has for instance been previously agreed to by the BS and UE via RRC signalling). When the UE detects information for it on a HS-SCCH with a given channelization code, it switches to the DL carrier for receiving the HS-PDSCH as indicated by the implicit relationship between the channelization code and DL carrier number according to the previously agreed mapping. For instance, if UE decodes the HS-SCCHs of FIG. 4 and notices that the UE id allocated for it matches with the UE id mask used on channelisation code C, then the UE knows that it has data transmission on band C. Similarly, if data is transmitted on band D then the associated control is transmitted on HS-SCCH using channelisation code D:

As described above, according to this invention it is proposed to allocate multiple UE IDs for one UE, one for each possible new L1 parameter. Some examples follow.

UE ID to Indicate DL Carrier

This example has already been mentioned in connection with FIGS. 3 and 4 but will now be further elaborated upon here, especially as the invention pertains to the communication of multiple services at the same time. According to this embodiment of the invention it is proposed to allocate multiple UE IDs for one UE, for example, one for each possible frequency carrier allocated for the UE. As previously mentioned, the mapping between the UE ID and the carrier frequency can for instance be agreed upon between UE and network via RRC signalling at the connection setup phase. The UE ID continues to be used on the HS-SCCH in the same way as it is used today: both for UE specific masking of the first part of the HS-SCCH TTI as well as for the UE specific CRC.

When the Node B scheduler allocates for a UE some HS-PDSCH code channels on a given frequency carrier, it sends the corresponding parameters on HS-SCCH using the UE ID which corresponds to this carrier, i.e., which is associated with this carrier by the above mentioned mapping.

The UE receives the HS-SCCH channels as usual, searching for its UE ID. Now, according to this invention, the UE has to check several UE IDs and if it finds one (or several) UE ID(s) allocated for it, the UE then knows to start receiving on the carrier(s) indicated by the received UE ID(s) using the parameter values given on HS-SCCH. Thus a new way of searching for the UE is that instead of searching for only one UE ID, as in the prior art, it has to search for several UE IDs. Based on the UE specific masking of the first part of the HS-SCCH TTI, the UE now knows the modulation scheme, channelization code set and also the DL carrier.

As pointed out already above, the same mechanism can be used to indicate several carriers at the same time. If the UE is capable of receiving data on multiple carriers simultaneously, this same mechanism can be used to indicate those carriers: Node B will signal to this one UE using several HS-SCCHs simultaneously, using corresponding different UE IDs on each HS-SCCH (i.e., one HS-SCCH and one UE ID per carrier). The data transmitted on different HS-PDSCH carriers may belong to one transport block or to several transport blocks. If they belong to one transport block, the transport block size should be the sum of the transport block sizes signaled on the corresponding HS-SCCHs. If the data is transmitted in several transport blocks, then there should be one transport block per carrier and each HS-SCCH carries information about one carrier only.

UE ID to Indicate HARQ (Hybrid Automatic Repeat Request) Process ID

If more than one transport block is transmitted to one UE during one TTI (either on separate carriers or on a separate data stream (e.g., MIMO)), separate HARQ processes need to be allocated to each of them. This is because, for each process, data blocks can become available at the receiver out of sequence due to the propagation channel or path quality and they need to be reordered by such means. Node B could signal to this one UE using several HS-SCCHs simultaneously, using corresponding different UE IDs on each HS-SCCH. Now the UE IDs on each HS-SCCH uniquely identify the correct HARQ process for the relevant transport block. Effectively this would mean that the UE id identifies the data stream. The UE ID would tell the set of HARQ processes and HARQ process ID the actual ID within the set. This effectively results in HARQ processes 1A and 1B, 2A and 2B, etc., i.e., two HARQ process sets A and B and eight processes within each set. Alternatively, the eight HARQ processes (as is possible in the prior art with a three bit HARQ process ID) may not be enough. By allocating two UE IDs for one UE, the number of HARQ processes can be doubled.

UE ID to Separate Control and Data

It would be useful to be able to distinguish data and control (e.g., SRBs) already at the physical layer, i.e., at the earliest stage. This would allow different routing of data and control immediately at the lowest layer, e.g., high data rate data could be routed directly to some output port without processing every PDU in the MAC layer processor. Or SRBs could easily be given higher priority at every processing stage when they could be distinguished from other data.

UE ID to Indicate First Transmission and Retransmission

Another example could be to indicate with the UE ID whether the transmission is the first transmission or a retransmission of a transport block. This is currently done partly with NDI (new data indicator), but if UE misses the first transmission, it does not know whether the transmission is a first transmission or a retransmission (NDI tells whether to combine it with the previous or not). For some applications this could be useful.

Figure 5:
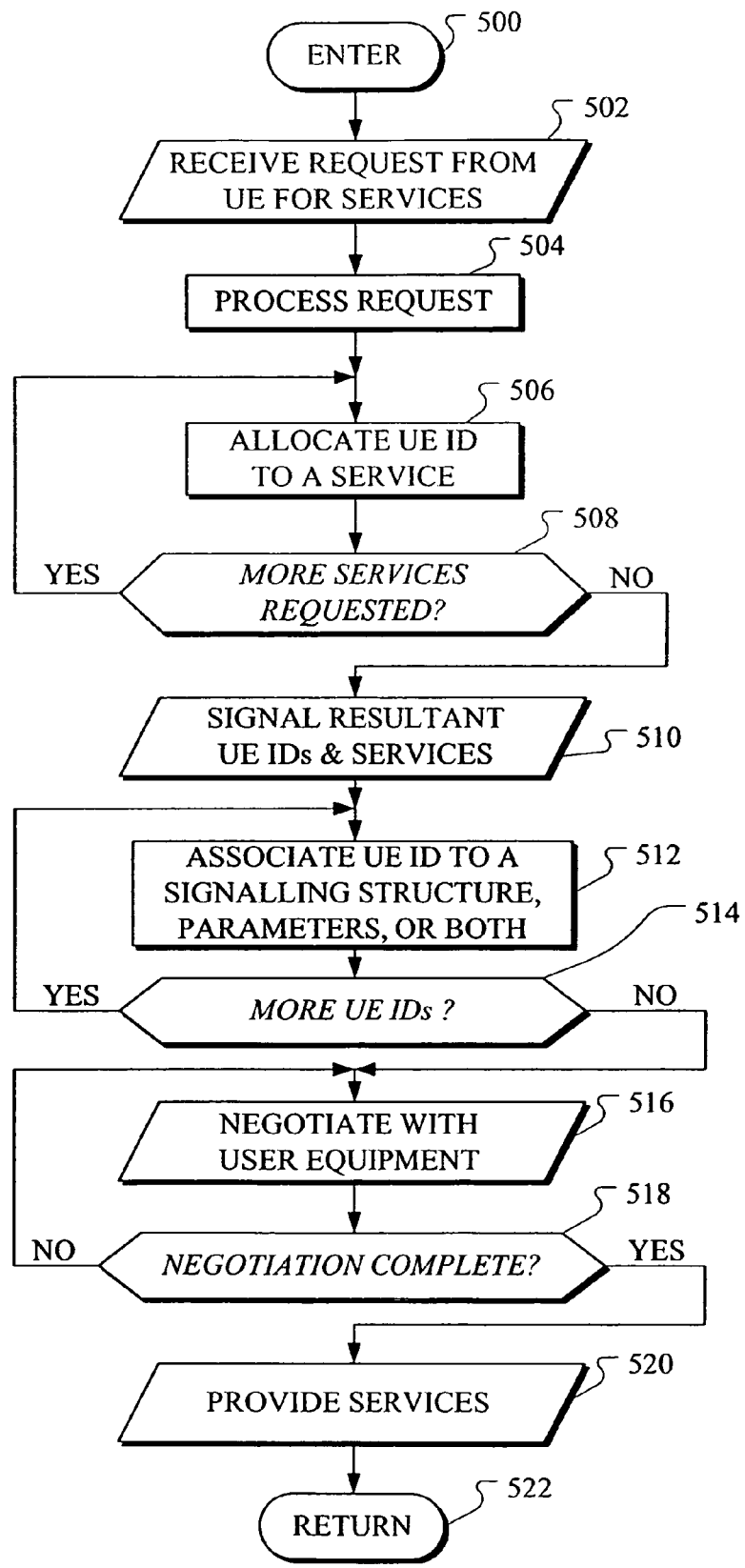
FIG. 5 is a flowchart showing a series of steps which may be carried out in a network element according to the invention.

FIG. 5 is a flowchart illustrating a series of steps which may be carried out by the signal processor 14a in the network element 10a of FIG. 1B, similar to the process already described in connection with both FIGS. 1A and 1B. After entering in a step 500, a step 502 is executed in which a request is received from the UE 10b for a service or for plural services. The receiver module 12a processes the request in a step 504 and provides the processed request signal on the line 20a to the identification module 22a. The identification module carries out a step of allocating or assigning the user equipment an identifier for one of the services requested. In a step 508, the network element 10a determines if more services have been requested by the UE 10*b*. If so, the identification module carries out an additional assignment of an identifier for another service requested or even for the same service. More services can be determined in the step 508 and additional UE identifiers assigned in the step 506 until no more services are determined as being requested. Once all of the services have had assignments of identifiers made, a step 510 is executed to signal the resultant user equipment identifiers and services to the association module 26*a*. Of course, the process can be done one at a time instead of all at once as described. Once the association module 26*a* receives the user identifiers assigned for each service requested, it associates to each identifier a signalling structure, or parameters, or both, appropriate for the requested service. If multiple user equipment identifiers have been provided to the association module 26*a*, it can make such a determination in a step 514 and continue to associate signalling structures, or parameters, or both, as appropriate, to each user equipment identifier. Once it is determined that there are no more user equipment identifiers that need to have signalling structures, or parameters, or both, associated therewith, a negotiation process begins in a step 516 so that the user equipment can be made agreeable to the signalling structures, or parameters, or both, and associated user equipment identifiers before the actual services are delivered on another payload channel. This process can take place between peer RRC layer entities at the UE and the network sides. Once the negotiation is completed as determined in a step 518, the services may be provided for instance as indicated in the step 520 using parameters carried in the signalling structures associated with the user identifier that is assigned for a given service. A return is then made in a step 522.

Figure 6:
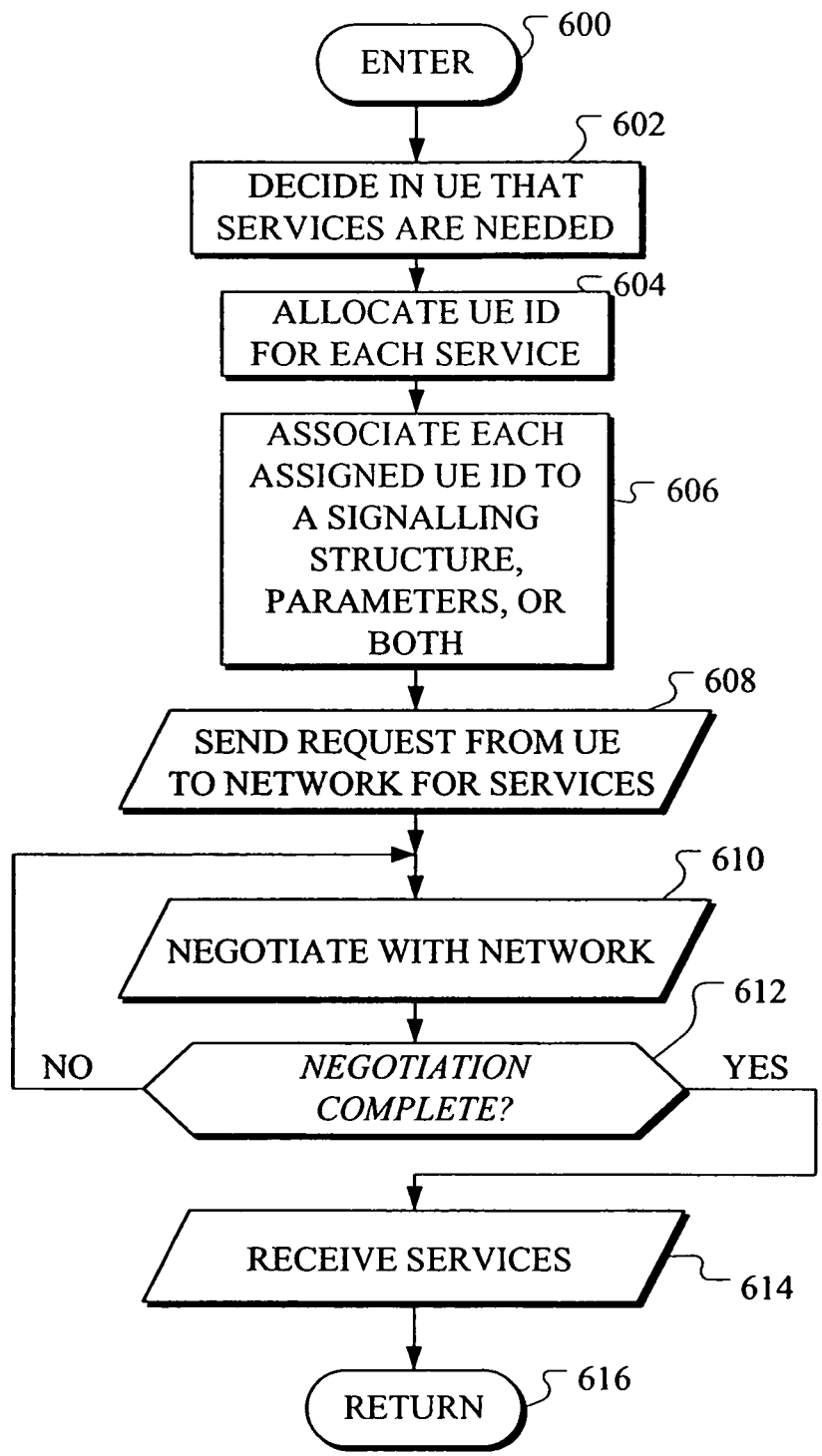
FIG. 6 is a flowchart showing a series of steps which may be carried out in user equipment according to the present invention.

FIG. 6 shows a series of steps that may be carried out in the user equipment 10*b* of FIG. 1B, but as is also the case for FIG. 6, it is only an example and the invention is not limited by the specific steps shown or their specific order and can moreover be carried out in a distributed fashion by different modules or entities. After entering in a step 600, the decision is made in the user equipment 10*b* that the user equipment needs services as indicated in a step 602. This might be carried out in an application layer that is not illustrated in FIG. 1B. However, such an application layer process can signal to the identification module 22*b* of the need for services and the identification module 22*b* will then assign a user equipment identifier for each such service (or even for a single service) that is needed as indicated in the step 604. The identification module 22*b* will then indicate to the association module 22*b* by means of the signal on the line 24*b* of the assigned user equipment identifiers. The association module 26*b* will then carry out a step 606 to associate each assigned user equipment identifier to a signalling structure, or parameters, or both, appropriate for the given needed service. The assigned user identifiers with associated signalling structures, or parameters, or both, are then communicated on the line 28*b* to the negotiation module 30*b* which then sends a request from the user equipment over the wireless interface to the network for the needed services as indicated in a step 608. As discussed previously in connection with FIG. 1B, this request can be sent on the signal line 32*b* via the transmitter module 16*b* and the antenna 17 over the wireless interface to the network element 10*a* for negotiation. It should also be mentioned that the step 604, 606 can be skipped if it is desired to have the network element do the assignment of the user equipment identifiers and the association of signalling structures, or parameters, or both. In any event, the previously described negotiation process can then be carried out as indicated in a step 610 in FIG. 6. Once it is determined in a step 612 that the negotiation process is complete, a step 614 is executed to receive the services provided by the network on physical channels delivered using parameters signaled by means of the signalling structures, or parameters, or both, associated with the assigned user equipment identifiers. A return is then made in a step 616.

Figure 7:
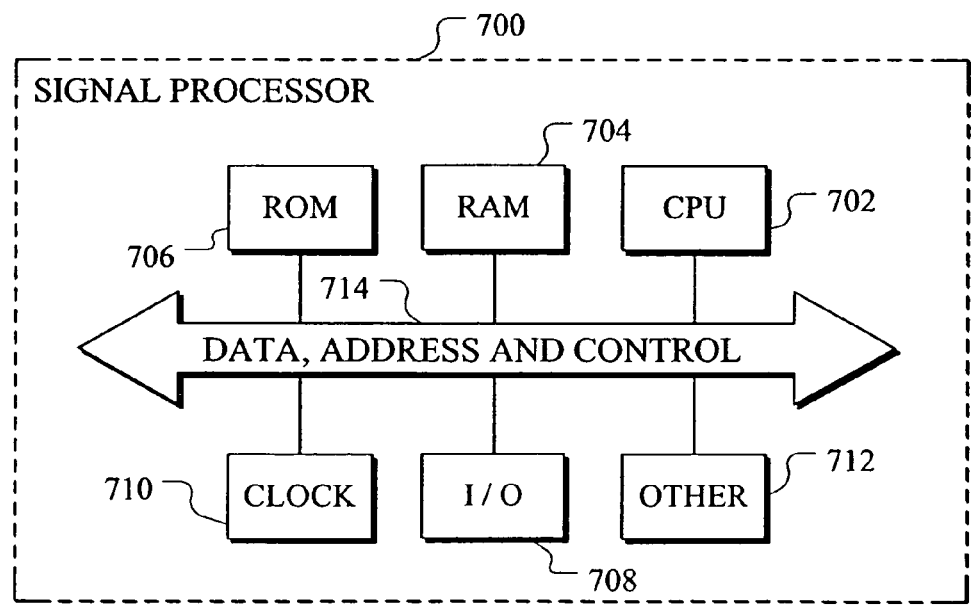
FIG. 7 shows a signal processor for carrying out the invention.

FIG. 7 shows a general purpose signal processor 700 which may be used to carry out the steps shown in FIG. 6 or 7. As such, it would take the place of processor 14*a* or 14*b*, or both 14*a* and 14*b*. It may be comprised of components constituting a general purpose signal processor including a central processing unit 702, a random access memory 704, a read only memory 706, an input/output device 708, a clock 710, and other components 712, all interconnected by data, address and control lines 714. It will be appreciated that the steps of FIG. 5 or the steps of FIG. 6 can be encoded using a computer programming language and stored for execution in the read only memory 706 of the signal processor 700. The central processing unit 702 would then execute the coded instructions, storing certain results of computation in the random access memory 704 and interchanging data over the bus 714 with the input/output device 708 which in turn communicates with the receiver module 12 or the transmitter module 16 of FIG. 1A. In addition to the signal processor shown in FIG. 7, it will be appreciated by any person of skill in the art that one or more of the modules 22, 26, 30, 38 of FIG. 1A can be incorporated into an integrated circuit or set of integrated circuits which in combination are capable of carrying out the above-described invention.

Referring to FIG. 1B and FIG. 5, the already described steps 502, 504, 506, 508 and 510 shown in FIG. 5 can be viewed, when coded using a computer programming language stored in the signal processor 700 of FIG. 7 as means for carrying out the assignment function of the identification module 22*a* function of FIG. 1B. Similarly, the steps 512 and 514 of FIG. 5 can also be encoded in a computer programming language and stored in the signal processor ROM 706 of FIG. 7 and executed by the signal processor 700 to carryout the function of the association module 26*a* of FIG. 1B. As such, the steps 512, 514 of FIG. 5 constitute means for associating a signalling structure, or parameters, or both, for each of the plurality of user equipment identifiers from among the plurality of different signalling structures, or parameters, or both. Not shown in FIG. 5 is another step that may be carried out as well, i.e., a step of signalling from the association module 26*a* to the negotiation module 30*a* with the signal on the line 28*a*. Such a function may also be carried out by the encoded instructions stored in the ROM 706 of the signal processor 700 and be a part of the association module or means function. Likewise, the negotiation module 30*a* of FIG. 1B may be carried out by the signal processor 700 of FIG. 7 using encoded instructions according to a signal processing language selected by the designer for carrying out the steps 516, 518 of FIG. 5 in a network element such as the network element 10*a* of FIG. 1B. The step 520 of FIG. 5 of course corresponds to the service module 38*a* function shown in FIG. 1B when carried out in the signal processor 700 of FIG. 7 according to the code stored in the ROM 706 and written according to the selected programming language.

Referring to the right hand side of FIG. 1B, and in particular to the signal processor modules shown within the signal processor block 14*b*, the functions of the modules 22*b*, 26*b*, 30*b*, and 38*b* may also be viewed as capable of being carried out by a signal processor such as the signal processor 700 shown in FIG. 7 in a manner similar to that which has just been described above in connection with the left hand side of FIG. 1B. Thus, the signal processor 700 of FIG. 7 can be viewed as including means for assigning the plurality of user equipment identifiers for a single user equipment corresponding to the identification module function 22b of FIG. 1B and carried out for example according to the step 604 of FIG. 6 in the environment shown in FIGS. 1B & 6 where the UE 10b decides in the step 602 that services are needed. Similarly, the signal processor 700 can be viewed as including means for associating a signalling structure for each of the plurality of user equipment identifiers from among a plurality of different signalling structures such as illustrated in the step 606 of FIG. 6. The functions of the service module 38b of FIG. 1B can also be carried out by the signal processor 700 by means of a computer program stored in the signal processor 700 for carrying out the step 614 shown in FIG. 6. As for the negotiation module 30b of FIG. 1B, the functions shown by the steps 608, 610, 612 of FIG. 6 can be encoded in a computer programming language and stored in the ROM 706 of the signal processor 700 of FIG. 7 for execution by the signal processor. As such, the signal processor 700 may be viewed as including means for negotiating the identifiers with the user equipment according to the steps shown in FIG. 6 and/or FIG. 1B.

Although the invention has been shown and described with respect to a best mode embodiment thereof, it will be evident to those of skill in the art that various other devices and methods can be provided to carry out the objectives of the present invention while still falling within the coverage of the appended claims. While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A method, comprising:
    allocating a plurality of user equipment identifiers for a single user equipment according to a corresponding plurality of services,
    associating parameters, for each of said plurality of user equipment identifiers from among a plurality of different parameters, wherein said corresponding plurality of services are provided from a network element to said single user equipment on a corresponding plurality of transport channels, and wherein each transport channel provided by said network element is recoverable by said single user equipment according to the associated parameters of a corresponding one of said user equipment identifiers, and
    negotiating said identifiers with said single user equipment.

2. The method of claim 1, for execution in said single user equipment, further comprising negotiating said identifiers with a network element.

3. The method of claim 2, further comprising receiving a service from a network element on a transport channel provided by said network element and recoverable according to parameters associated with a corresponding one of said user equipment identifiers.

4. The method of claim 2, further comprising receiving said corresponding plurality of services from said network element on a corresponding plurality of transport channels, each transport channel recoverable according to a parameters associated with a corresponding one of said user equipment identifiers.

5. The method of claim 2, further comprising receiving a service from a network element on a transport channel provided by said network element and recoverable according to parameters of a signalling channel also from said network element and associated with a corresponding one of said user equipment identifiers.

6. The method of claim 2, further comprising receiving said corresponding plurality of services from said network element on a corresponding plurality of transport channels, each transport channel recoverable according to parameters of a signalling channel also from said network element and associated with a corresponding one of said user equipment identifiers.

7. The method of claim 1, for dynamically changing between said associated parameters for different transmission time intervals for said single user equipment receiving said corresponding plurality of services as correspondingly different packet-switched services in said different transmission time intervals.

8. The method of claim 7, further comprising providing a service from said network element to said single user equipment on a transport channel recoverable according to parameters associated with a corresponding one of said user equipment identifiers.

9. The method of claim 7, further comprising providing said corresponding plurality of services from said network element to said single user equipment on a corresponding plurality of transport channels, each transport channel recoverable according to parameters associated with a corresponding one of said user equipment identifiers.

10. The method of claim 1, for execution in a network element, further comprising, before said allocating, receiving a request from a user equipment for said plurality of services and, after said associating, and thereafter providing said corresponding plurality of services from said network element to said single user equipment on said corresponding plurality of transport channels with services recoverable according to parameters associated with corresponding user equipment identifiers.

11. The method of claim 1, for execution in said network element, further comprising providing a service from said network element to said single user equipment on a transport channel recoverable according to parameters associated with a corresponding one of said user equipment identifiers.

12. The method of claim 1, for execution in a network element, further comprising providing said corresponding plurality of services from said network element to said single user equipment on a corresponding plurality of transport channels, each transport channel recoverable according to parameters associated with a corresponding one of said user equipment identifiers.

13. The method of claim 1, for execution in said network element, further comprising providing said corresponding plurality of services from said network element to said single user equipment on a corresponding plurality of transport channels, each transport channel recoverable according to parameters associated with a corresponding one of said user equipment identifiers.

14. The method of claim 1, for execution in said single user equipment, further comprising, before said allocating, deciding that said plurality of services are needed and, after said associating, sending a request to said network element for said plurality of services, negotiating said user equipment identifiers with said network element and thereafter receiving said plurality of services from said network element on corresponding transport channels provided by said network element and recoverable according to parameters associated with corresponding user equipment identifiers.

15. The method of claim 1, for execution in said single user equipment, further comprising receiving a service from said network element on a transport channel provided by said network element and recoverable according to parameters associated with a corresponding one of said user equipment identifiers.

16. The method of claim 1, for execution in said single user equipment, further comprising receiving said corresponding plurality of services from said network element on a corresponding plurality of transport channels, each transport channel recoverable according to parameters associated with a corresponding one of said user equipment identifiers.

17. The method of claim 1, for execution in said single user equipment, further comprising receiving said corresponding plurality of services from said network element on a corresponding plurality of transport channels, each transport channel recoverable according to parameters associated with a corresponding one of said user equipment identifiers.

18. The method of claim 1, wherein said plurality of different parameters are needed by the single user equipment to receive said corresponding plurality of services in simultaneous sessions.

19. The method of claim 1, for execution in a multi-carrier system in which said associating comprises associating an identifier with said single user equipment and a radio downlink carrier in said multi-carrier system in said radio downlink.

20. The method of claim 19, wherein said associating is an explicit indication of said carrier on which the single user equipment should receive a payload channel.

21. The method of claim 19, wherein said associating is an implicit indication where a channelization code is used for encoding the parameters to indicate the carrier on which the single user equipment should receive a payload channel.

22. The method of claim 1, wherein an identifier among said plurality of user equipment identifiers is for association with parameters for indicating one or more physical layer related parameters.

23. The method of claim 22, wherein the one or more physical layer related parameters are one or more hybrid automatic repeat request process identifiers.

24. The method of claim 22, wherein the one or more physical layer related parameters are indicative of whether a downlink shared channel carries control information or data.

25. The method of claim 22, wherein the one or more physical layer related parameters are indicative of whether a transmission of a downlink shared channel is a first transmission or a retransmission.

26. The method of claim 1, wherein said allocating comprises allocating said plurality of user equipment identifiers to said single user equipment to indicate some corresponding physical layer parameters.

27. The method of claim 1, wherein each identifier among said plurality of identifiers is used to indicate a corresponding carrier.

28. The method of claim 1, wherein an identifier among said plurality of identifiers is used to indicate a hybrid automatic repeat request process.

29. The method of claim 1, wherein an identifier among said plurality of identifiers is used to indicate control information or data.

30. The method of claim 1, wherein an identifier among said plurality of identifiers is used to indicate whether a transmission is a first transmission or a retransmission.

31. The method of claim 1, wherein said associating a signalling parameters for each of said plurality of user equipment identifiers is implicit.

32. The method of claim 1, wherein said associating a signalling parameters for each of said plurality of user equipment identifiers is explicit.

33. A device, comprising:
an allocation module, responsive to a request signal, for providing a signal indicative of a plurality of user equipment identifiers for a single user equipment according to a corresponding plurality of services;
an association module, responsive to said signal indicative of said plurality of user equipment identifiers for associating parameters for each of said plurality of user equipment identifiers from among a plurality of different parameters and for providing a signal indicative of the plurality of user equipment identifiers and their associated parameters, wherein said corresponding plurality of services are provided from a network element to said single user equipment on a corresponding plurality of transport channels, and wherein each transport channel provided by said network element is receivable by said single user equipment according to the associated parameters of a corresponding one of said user equipment identifiers; and
a negotiation module, responsive to said signal indicative of the plurality of user equipment identifiers and their associated parameters, for negotiating said identifiers and their associated parameters with said single user equipment.

34. The device of claim 33, for use in said single user equipment, further comprising a negotiation module, responsive to said signal indicative of the plurality of user equipment identifiers and their associated parameters, for negotiating said identifiers and their associated parameters with a network element and for providing a negotiated signal indicative of negotiated identifiers and associated parameters.

35. The device of claim 34, for use in said single user equipment, further comprising a service module, responsive to said negotiated signal, for use in receiving a service from a network element on a transport channel recoverable by said network element according to parameters associated with a corresponding one of said user equipment identifiers.

36. The device of claim 33, for use in said network element, further comprising a service module, responsive to said negotiated signal for providing a service from said network element to said single user equipment on a transport channel recoverable according to said negotiated identifiers and associated parameters.

37. The device of claim 33, for use in dynamically changing between different associated parameters for different transmission time intervals for said single user equipment receiving said corresponding plurality of services as correspondingly different packet-switched services in said different transmission time intervals.

38. The device of claim 33, wherein an identifier among said plurality of user equipment identifiers is for association with a parameter indicative of a physical layer related parameter.

39. The device of claim 38, wherein the physical layer related parameter is a hybrid automatic repeat request process identifier.

40. The device of claim 38, wherein the physical layer related parameter is indicative of whether a transmission of a downlink shared channel is a first transmission or a retransmission.

41. The device of claim 33, wherein said allocating comprises allocating said plurality of user equipment identifiers to said single user equipment to indicate some corresponding physical layer parameters.

42. The device of claim 33, wherein said plurality of different parameters are needed by the single user equipment to receive said corresponding plurality of services in simultaneous sessions.

43. The device of claim 33, wherein an identifier among said plurality of identifiers is used to indicate a hybrid automatic repeat request process.

44. The device of claim 33, wherein an identifier among said plurality of identifiers is used to indicate control information or data.

45. The device of claim 33, wherein an identifier among said plurality of identifiers is used to indicate whether a transmission is a first transmission or a retransmission.

46. The device of claim 33, wherein said associating a signalling structure for each of said plurality of user equipment identifiers is implicit.

47. The device of claim 33, wherein said associating a signalling structure for each of said plurality of user equipment identifiers is explicit.

48. A device, comprising:
a processor; and
memory including computer program code, the memory and the computer program code configured to, with the processor, cause the device at least to:
allocate a plurality of user equipment identifiers for a single user equipment according to a corresponding plurality of services, and
associate parameters for each of said plurality of user equipment identifiers from among a plurality of different parameters, wherein said corresponding plurality of services are provided from a network element to said single user equipment on a corresponding plurality of transport channels, and wherein each transport channel provided by said network element is receivable by said single user equipment according to the associated parameters of a corresponding one of said user equipment identifiers, and
negotiating said identifiers with said single user equipment.

49. The device of claim 48, for use in said single user equipment, wherein the memory and the computer program code is configured to, with the processor, cause the device to negotiate said identifiers with a network element.

50. The device of claim 49, for use in said single user equipment, wherein the memory and the computer program code is configured to, with the processor, cause the device to receive a service from a network element on a transport channel provided by said network element and recoverable according to parameters associated with a corresponding one of said user equipment identifiers.

51. The device of claim 49, for use in said single user equipment, wherein the memory and the computer program code is configured to, with the processor, cause the device to receive a service from said network element on a transport channel provided by said network element and recoverable according to parameters associated with a corresponding one of said user equipment identifiers.

52. The device of claim 49, for use in said single user equipment, wherein the memory and the computer program code is configured to, with the processor, cause the device to receive said corresponding plurality of services from said network element on a corresponding plurality of transport channels, each transport channel recoverable according to parameters associated with a corresponding one of said user equipment identifiers.

53. The device of claim 48, wherein the memory and the computer program code is configured to, with the processor, cause the device to dynamically change between said different parameters for different transmission time intervals for said single user equipment receiving said corresponding plurality of services as correspondingly different packet-switched services in said different transmission time intervals.

54. The device of claim 48, for use in a network element, wherein the memory and the computer program code is configured to, with the processor, cause the device to provide a service from said network element to said single user equipment on a transport channel recoverable according to a parameter associated with a corresponding one of said user equipment identifiers.

55. The device of claim 48, for use in said network element, wherein the memory and the computer program code is configured to, with the processor, cause the device to provide a service from said network element to said single user equipment on a transport channel recoverable according to parameters associated with a corresponding one of said user equipment identifiers.

56. The device of claim 48, for use in a network element, wherein the memory and the computer program code is configured to, with the processor, cause the device to provide said corresponding plurality of services from said network element to said single user equipment on a corresponding plurality of transport channels, each transport channel recoverable according to parameters associated with a corresponding one of said user equipment identifiers.

57. The device of claim 48, for use in said network element, wherein the memory and the computer program code is configured to, with the processor, cause the device to provide said corresponding plurality of services from said network element to said single user equipment on a corresponding plurality of transport channels, each transport channel recoverable according to parameters associated with a corresponding one of said user equipment identifiers.

58. The device of claim 48 for use in a multi-carrier code division multiple access system in which said associating comprises associating an identifier of said single user equipment with a radio downlink carrier in said multi-carrier code division multiple access system.

59. The device of claim 48, wherein an identifier among said plurality of user equipment identifiers is for association with parameters indicative of a physical layer related parameter.

60. The device of claim 48, wherein said plurality of different parameters are needed by the single user equipment to receive said corresponding plurality of services in simultaneous sessions.

61. The device of claim 48, wherein an identifier among said plurality of identifiers is used to indicate a hybrid automatic repeat request process.

62. The device of claim 48, wherein an identifier among said plurality of identifiers is used to indicate control information or data.

63. The device of claim 48, wherein an identifier among said plurality of identifiers is used to indicate whether a transmission is a first transmission or a retransmission.

64. The device of claim 48, wherein said associating parameters for each of said plurality of user equipment identifiers is implicit.

65. The device of claim 48, wherein said associating parameters for each of said plurality of user equipment identifiers is explicit.

66. A non-transitory computer readable medium having a computer program stored thereon, the computer program executed by at least one processor to perform:

allocating a plurality of user equipment identifiers for a single user equipment according to a corresponding plurality of services, and for associating parameters for each of said plurality of user equipment identifiers from among a plurality of different signalling parameters, wherein said corresponding plurality of services are provided from a network element to said single user equipment on a corresponding plurality of transport channels, and wherein each transport channel provided by said network element is recoverable by said single user equipment according to the associated parameters of a corresponding one of said user equipment identifiers; and negotiating said identifiers with said single user equipment.

67. The non-transitory computer readable medium of claim 66, further comprising dynamically changing between said different parameters for different transmission time intervals for said single user equipment receiving said corresponding plurality of services as correspondingly different packet-switched services in said different transmission time intervals.

* * * * *